United States Patent
Yoon et al.

(10) Patent No.: US 11,322,119 B2
(45) Date of Patent: May 3, 2022

(54) SEMICONDUCTOR DEVICE

(71) Applicant: SAMSUNG ELECTRONICS CO., LTD., Suwon-si (KR)

(72) Inventors: Sung Chul Yoon, Hwaseong-si (KR); Seong Woon Kim, Suwon-si (KR); Hyeong-Seok Kim, Seoul (KR); Kil Whan Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1 day.

(21) Appl. No.: 16/791,856

(22) Filed: Feb. 14, 2020

(65) Prior Publication Data
US 2020/0388249 A1 Dec. 10, 2020

(30) Foreign Application Priority Data
Jun. 5, 2019 (KR) .................. 10-2019-0066676

(51) Int. Cl.
*G09G 5/36* (2006.01)
*G09G 5/395* (2006.01)
*G09G 5/393* (2006.01)
*G06T 1/20* (2006.01)

(52) U.S. Cl.
CPC .............. *G09G 5/395* (2013.01); *G06T 1/20* (2013.01); *G09G 5/393* (2013.01); *G09G 2320/0252* (2013.01); *G09G 2360/18* (2013.01)

(58) Field of Classification Search
CPC .... G09G 5/393; G09G 2360/18; G09G 5/395; G09G 5/363; G09G 5/12; G09G 2360/12; G09G 5/39; G09G 2340/14; G06T 1/0007
See application file for complete search history.

(56) References Cited

U.S. PATENT DOCUMENTS

| | | | |
|---|---|---|---|
| 8,223,159 B1 * | 7/2012 | Diard | G06T 1/20 345/522 |
| 8,704,732 B2 | 4/2014 | Pourbigharaz et al. | |
| 9,501,993 B2 | 11/2016 | Nambi et al. | |
| 2013/0120222 A1 * | 5/2013 | Graham | G06F 3/1431 345/1.1 |
| 2015/0206513 A1 * | 7/2015 | Asai | G09G 5/393 345/545 |
| 2016/0078851 A1 * | 3/2016 | Asai | G09G 5/18 345/555 |

(Continued)

FOREIGN PATENT DOCUMENTS

| | | |
|---|---|---|
| JP | 11-149283 A | 6/1999 |
| JP | 2000-322039 A | 11/2000 |

(Continued)

*Primary Examiner* — Hau H Nguyen
(74) *Attorney, Agent, or Firm* — Sughrue Mion, PLLC

(57) ABSTRACT

A semiconductor device includes a processor configured to perform a rendering operation of an image frame to acquire rendering data, and write the acquired rendering data on a memory device, and a display controller configured to perform a read operation of the memory device on which the rendering data is written, to acquire image data. The semiconductor device further includes a micro-sequencing circuit configured to transmit a start signal to the display controller, based on a degree of execution of the rendering operation. The display controller is further configured to, based on the transmitted start signal, start the read operation.

18 Claims, 12 Drawing Sheets

(56) References Cited

U.S. PATENT DOCUMENTS

2016/0358303 A1   12/2016  Juliano
2018/0061364 A1    3/2018  Cook et al.

FOREIGN PATENT DOCUMENTS

| JP | 2018-112695 A | 7/2018 |
| KR | 10-0718381 B1 | 5/2007 |
| KR | 10-1935356 B1 | 1/2019 |

\* cited by examiner

SEMICONDUCTOR DEVICE

CROSS-REFERENCE TO THE RELATED APPLICATION

This application is based on and claims priority under 35 U.S.C. § 119 to Korean Patent Application No. 10-2019-0066676 filed on Jun. 5, 2019, in the Korean Intellectual Property Office, the disclosure of which is incorporated by reference herein in its entirety.

BACKGROUND

1. Field

The disclosure relates to a semiconductor device.

2. Description of the Related Art

Recently, a technique for increasing a refresh rate of a display device has attracted attention. To prevent a phenomenon such as so-called sputtering or frame drop, when the refresh rate increases, an image frame is displayed at a speed corresponding thereto. However, because a resolution of the image frame tends to gradually increase, there is a limit to raise the speed at which the image frame is rendered.

SUMMARY

According to embodiments, a semiconductor device includes a processor configured to perform a rendering operation of an image frame to acquire rendering data, and write the acquired rendering data on a memory device, and a display controller configured to perform a read operation of the memory device on which the rendering data is written, to acquire image data. The semiconductor device further includes a micro-sequencing circuit configured to transmit a start signal to the display controller, based on a degree of execution of the rendering operation. The display controller is further configured to, based on the transmitted start signal, start the read operation.

According to embodiments, a semiconductor device includes a processor configured to perform a rendering operation of an image frame to acquire rendering data, and write the acquired rendering data on a frame buffer, and a micro-sequencing circuit configured to monitor a write pointer indicating a point on which the rendering data is written in the frame buffer, while the processor performs the rendering operation, and based on the monitored write pointer reaching a predetermined region or position of the frame buffer, transmit the monitored write pointer. The semiconductor device further includes a display controller configured to, based on the transmitted write pointer, perform a read operation of the frame buffer on which the rendering data is written, to acquire image data.

According to embodiments, a semiconductor device includes a memory device including a first frame buffer and a second frame buffer, a first processor configured to perform a first rendering operation of a first image frame to acquire first rendering data, and write the acquired first rendering data on the first frame buffer, and a second processor configured to perform a second rendering operation of a second image frame to acquire second rendering data, and write the acquired second rendering data on the second frame buffer. The semiconductor device further includes a micro-sequence circuit configured to control an operation of a display controller, based on a degree of execution of each of the first rendering operation and the second rendering operation.

DETAILED DESCRIPTION OF THE EMBODIMENTS

Aspects of embodiments provide a semiconductor device for shortening a time used until a display controller displays rendered image data after rendering of an image frame.

Hereinafter, the embodiments will be described with reference to the accompanying drawings.

Figure 1:
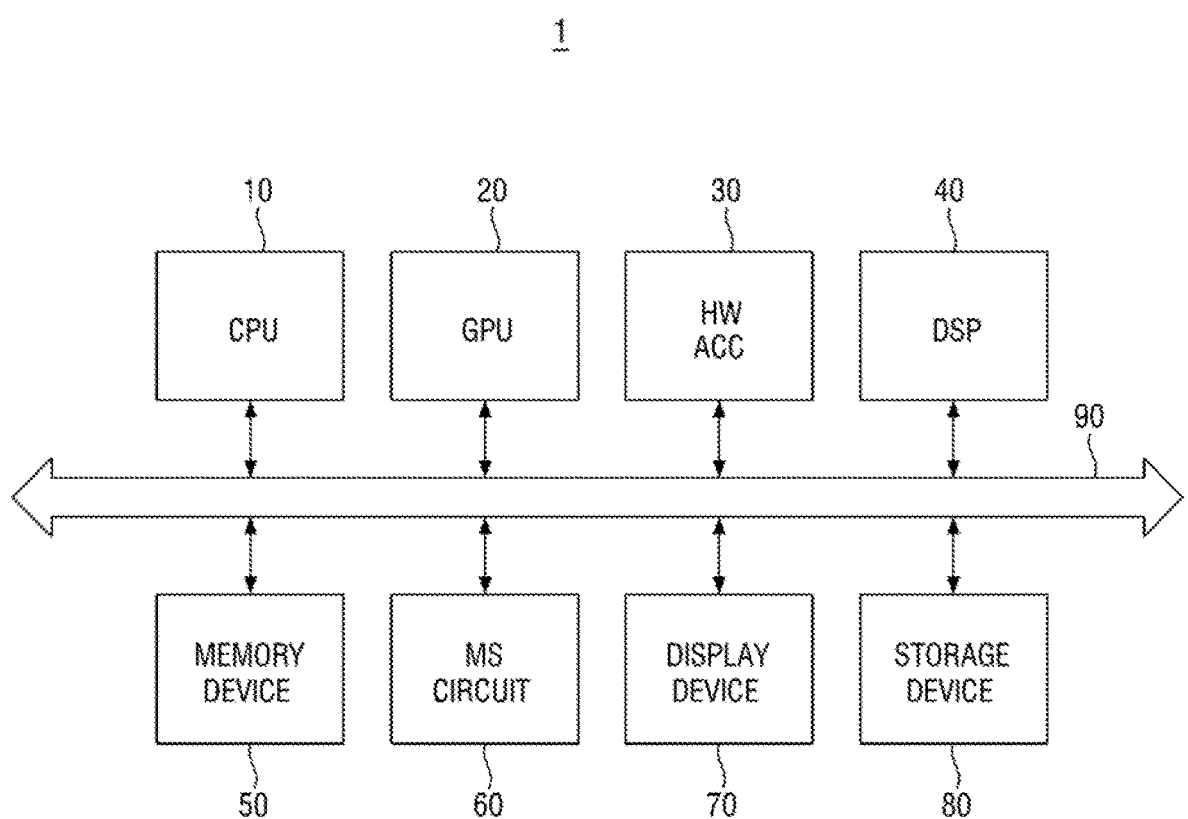
FIG. 1 is a block diagram of a semiconductor device according to embodiments.

FIG. 1 is a block diagram of a semiconductor device 1 according to embodiments.

Referring to FIG. 1, the semiconductor device 1 may include a central processing unit (CPU) 10, a graphic processing unit (GPU) 20, a hardware acceleration circuit 30 (HW ACC), a digital signal processor 40 (DSP), a memory device 50, a micro-sequencing (MS) circuit 60, a display device 70 and a storage device 80. The CPU 10, the GPU 20, the hardware acceleration circuit 30, the digital signal processor 40, the memory device 50, the micro-sequencing circuit 60, the display device 70 and the storage device 80 may transmit and receive data to and from each other through a bus 90.

The CPU 10 may control the semiconductor device 1 and execute a computation related to a program executed on the semiconductor device 1. The GPU 20 is a specialized processing device designed to be able to quickly perform mathematical computations for image rendering. The hardware acceleration circuit 30 is a device designed to speed up computations separately from the CPU 10 and the GPU 20. In this specification, although the hardware acceleration circuit 30 may be understood by a device that performs computations for image rendering separately from the GPU 20, the scope of the disclosure is not limited thereto.

On the other hand, the digital signal processor 40 numerically processes the digital signal, using various algorithms. The memory device 50 provides a space in which data used in the semiconductor device 1 may be temporarily stored. The display device 70 is used to provide a user with information on works performed in the semiconductor device 1. The storage device 80 provides a space in which data used in the semiconductor device 1 may be stored non-temporarily.

In embodiments, although the memory device 50 may include a dynamic random access memory (DRAM), the scope of the disclosure is not limited thereto.

The micro-sequencing circuit 60 is a hardware device that executes a series of controls that occur during the time to shorten the time used until the display device 70 displays the rendered frame after a device, such as the GPU 20 or the hardware acceleration circuit 30, performs the rendering operation of the image frame. Here, the series of controls means a control of work procedures performed until the display device 70 reads and displays the memory device 50 when the device such as the GPU 20 or the hardware acceleration circuit 30 generates rendering data and writes it on the memory device 50.

When the device such as the GPU 20 or the hardware acceleration circuit 30 generates the rendering data, writes it on the memory device 50, and then generates an interrupt on the CPU 10, unlike a method in which the CPU 10 controls the display device 70 to read the memory device 50, that is, a method in which the CPU 10 executes the software for performing the series of controls, the micro-sequencing circuit 60 may perform the above-described series of controls in hardware between the GPU 20 or the hardware acceleration circuit 30 and the display device 70 without intervention of the CPU 10.

Therefore, in this specification, only the GPU 20 or the hardware acceleration circuit 30 may be referred to as a "processor" in consideration of the feature in which the operation of the CPU 10 is not intervened.

Figure 2:
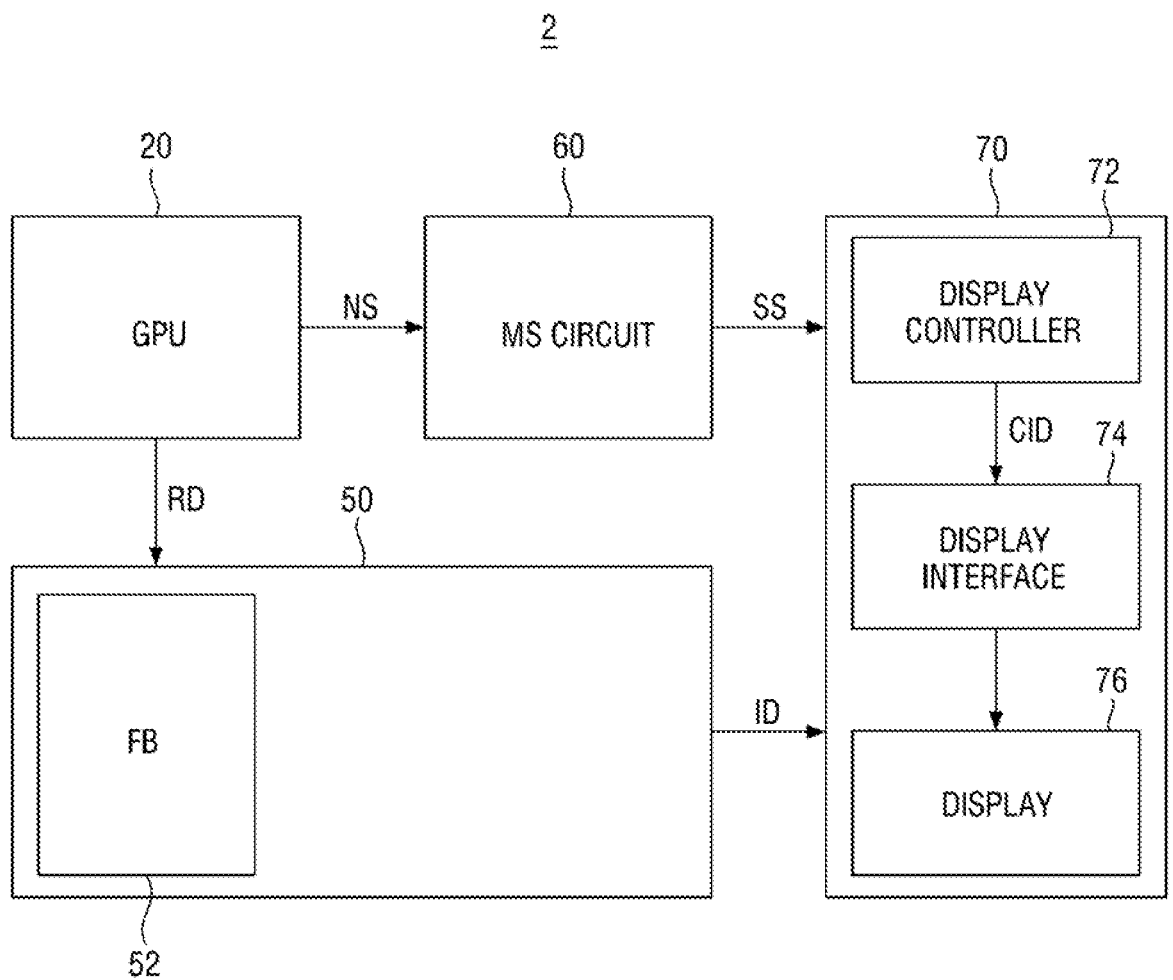
FIG. 2 is a block diagram of a semiconductor device according to embodiments.
Figure 3:
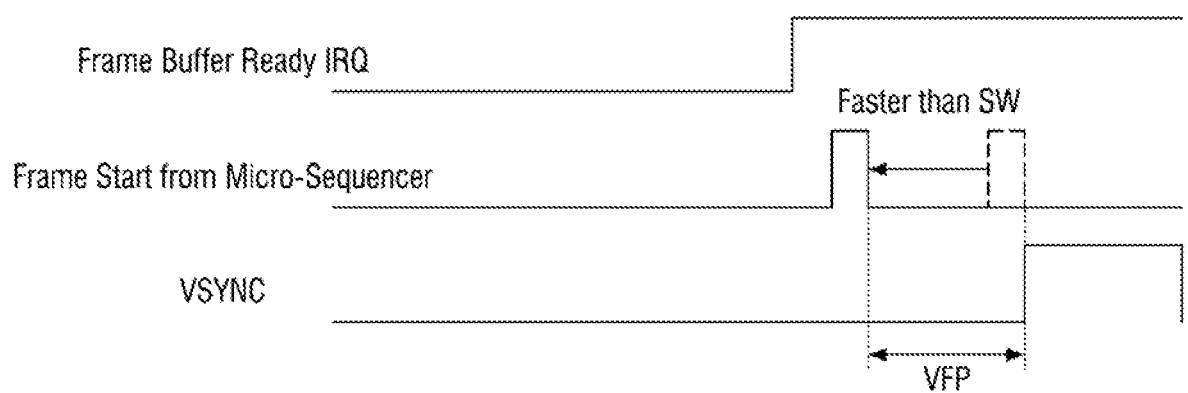
FIG. 3 is a diagram illustrating an operation of a semiconductor device, according to embodiments.

FIG. 2 is a block diagram of a semiconductor device 2 according to embodiments, and FIG. 3 is a diagram illustrating an operation of the semiconductor device 2, according to embodiments.

Referring to FIG. 2, the semiconductor device 2 includes the GPU 20, the memory device 50, the MS circuit 60, and the display device 70.

The GPU 20 may perform a rendering operation of the image frame to generate rendering data RD and write the generated rendering data RD on the memory device 50.

The memory device 50 may include a frame buffer 52 (FB) that may be accessed by the GPU 20. That is, the GPU 20 may write the generated rendering data RD on the frame buffer 52 of the memory device 50.

The display device 70 may include a display controller 72, a display interface 74 and a display 76. The display controller 72 executes a read operation for reading the memory device 50 to acquire image data ID. Further, the display controller 72 composes the image data ID to generate composite image data CID, and may display the composite image data CID on the display 76 through the display interface 74.

The micro-sequencing circuit 60 may transmit a start signal SS to the display controller 72 in accordance with a degree of execution of the rendering operation of the GPU 20. Then, the display controller 72 may start the read operation in response to the start signal SS received from the micro-sequencing circuit 60.

The GPU 20 may transmit a notification signal NS to the micro-sequencing circuit 60 after completing the rendering operation. Further, the micro-sequencing circuit 60 may transmit the start signal SS to the display controller 72 in response to the notification signal NS. Then, the display controller 72 may immediately start the read operation in response to the start signal SS received from the micro-sequencing circuit 60.

That is, according to the semiconductor device 2, the micro-sequencing circuit 60 may directly notify the display controller 72 of the fact that the GPU 20 completes the rendering operation without intervention of the CPU 10, and the display controller 72 may start the read operation immediately after receiving the notification. Therefore, the time used until the display device 70 displays the rendered frame after the GPU 20 performs the rendering operation of the image frame may be significantly reduced.

For example, referring to FIG. 3, considering a signal of "Frame Start from Micro-Sequencer" after the GPU 20 completes the work of writing the rendering data RD on the frame buffer 52 and a "Frame Buffer Ready IRQ" signal is transited from low to high, a high signal (a first high signal) indicated by a dotted line and a high signal (a second high signal) indicated by a solid line are shown. Here, the first high signal indicates a time point at which the display controller 72 may start to read the frame buffer 52 when processed by software (SW) under the intervention of the CPU 10, and the second high signal indicates a time point at which the display controller 72 may start to read the frame buffer 52 when processed by the micro-sequencing circuit 60 without intervention of the CPU 10. Because time delayed by software (SW) is reduced, the time between the high signal of Frame Start (a second high signal) and a high signal of VSYNC can be guaranteed as much as VFP. It is possible to understand from this fact that the time used until the display device 70 displays the rendered frame after the GPU 20 performs the rendering operation of the image frame is significantly reduced by the micro-sequencing circuit 60.

Referring to FIG. 2 again, although the GPU 20 is shown as the GPU, the scope of the disclosure is not limited thereto, and the GPU 20 may include any device that performs the rendering operation of the image frame.

On the other hand, although the notification signal NS may include an interrupt signal, the scope of the disclosure is not limited thereto.

Figure 4:
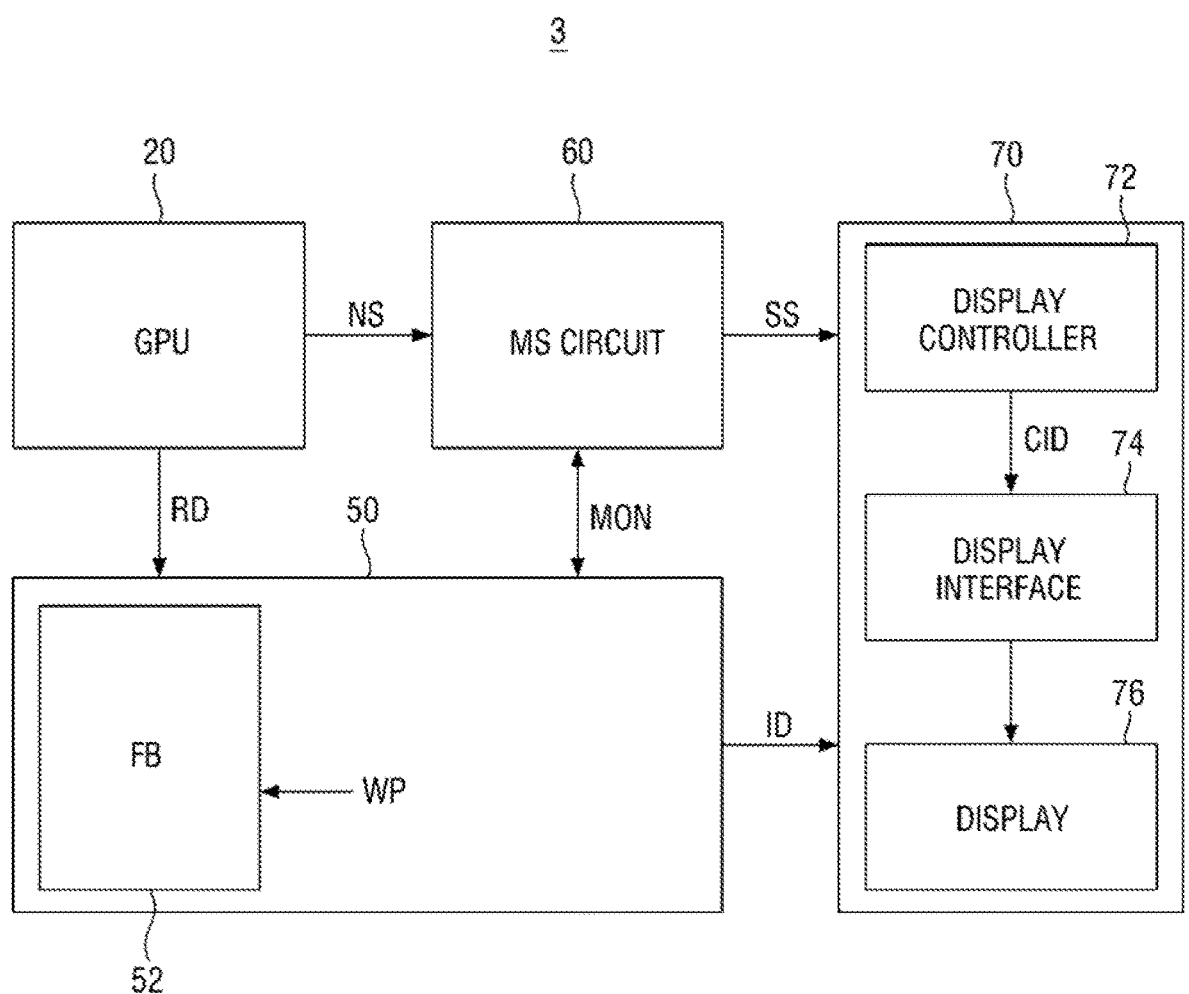
FIG. 4 is a block diagram of a semiconductor device according to embodiments.
Figure 5:
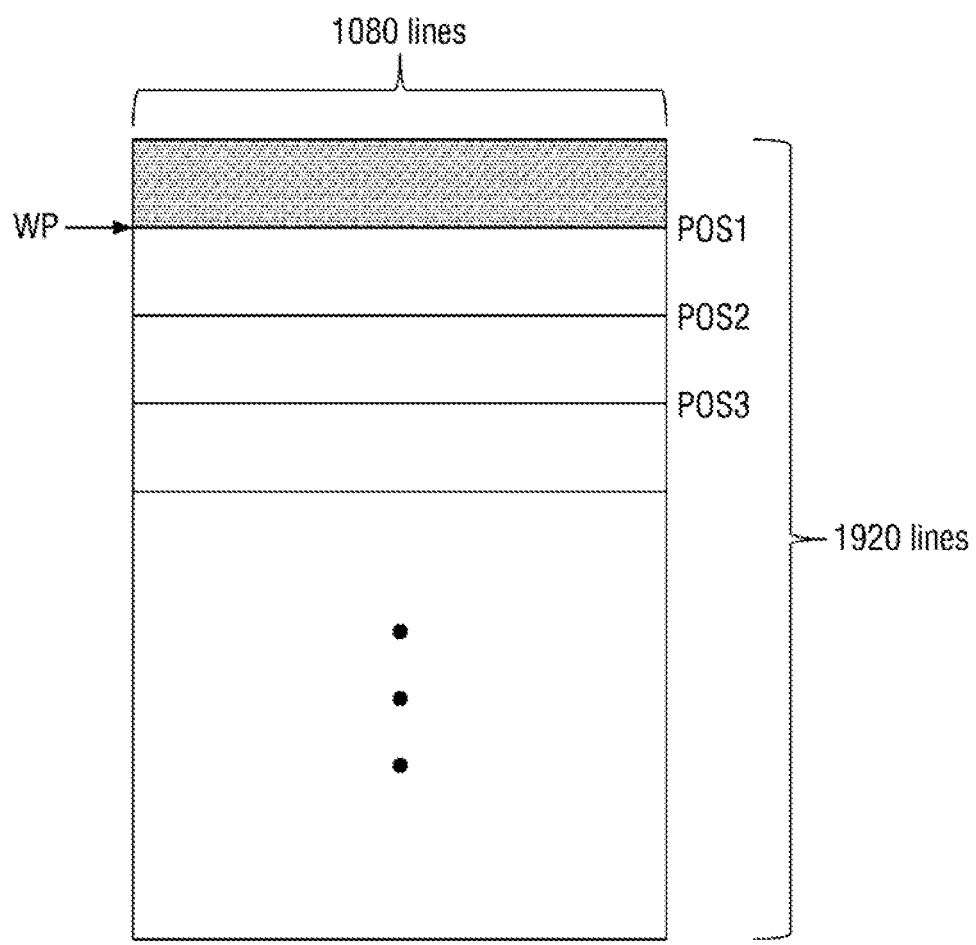
FIGS. 5, 6 and 7 are diagrams of a frame buffer according to embodiments.
Figure 6:
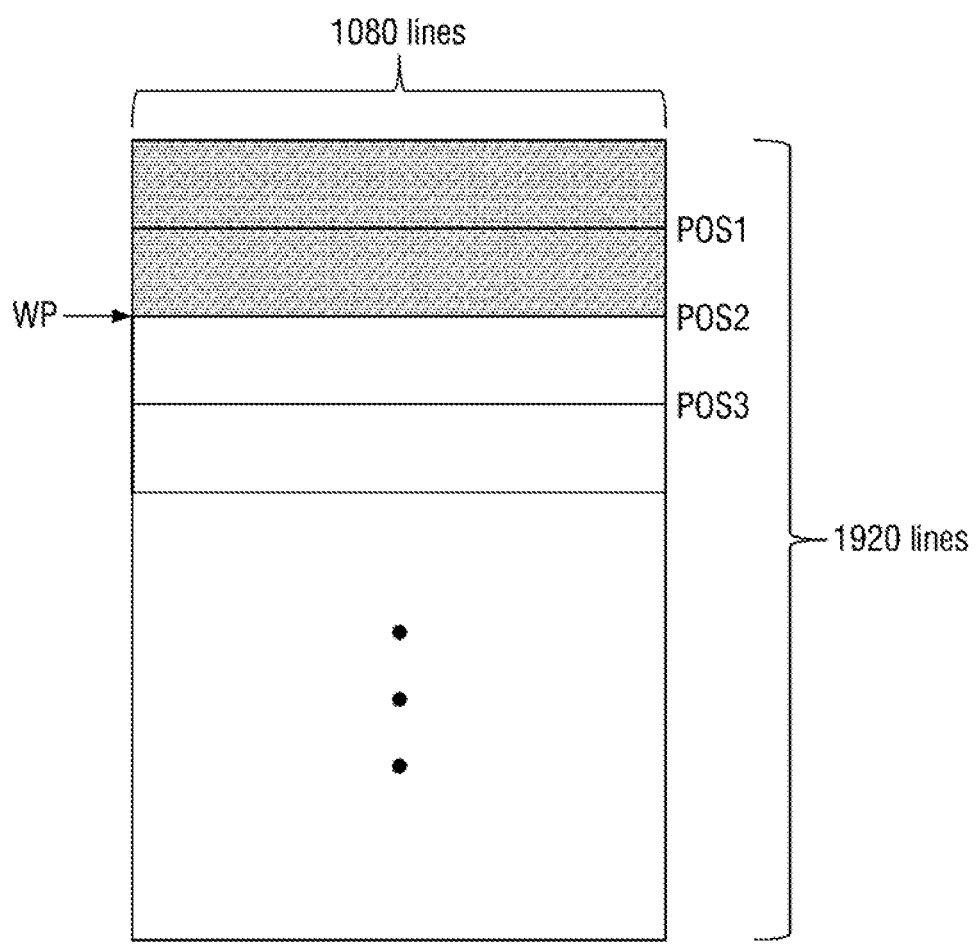
Figure 7:
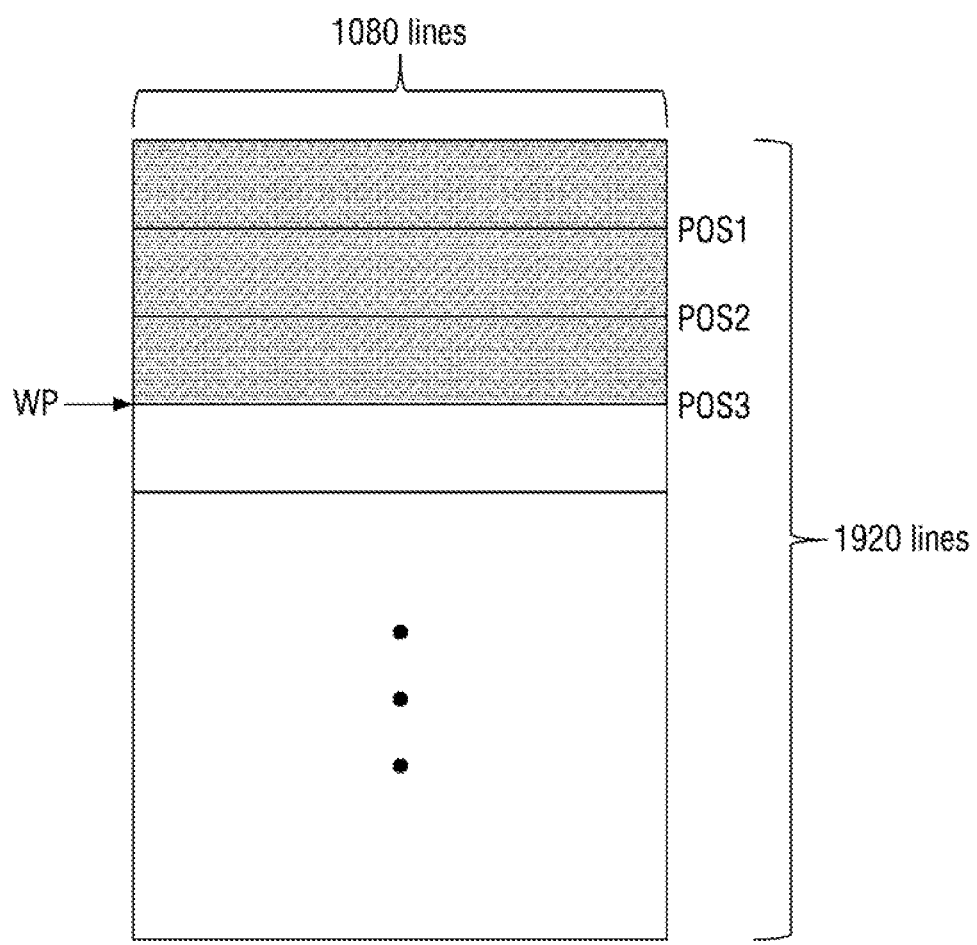

FIG. 4 is a block diagram of a semiconductor device 3 according to embodiments, and FIGS. 5, 6 and 7 are diagrams of a frame buffer according to embodiments.

Referring to FIG. 4, the semiconductor device 3 includes the GPU 20, the memory device 50, the MS circuit 60, and the display device 70.

Differences from the embodiments of FIG. 2 will be mainly described. The micro-sequencing circuit 60 may monitor (MON) the memory device 50 on which the rendering data RD is written while the GPU 20 performs the rendering operation. If the monitoring result satisfies a predetermined condition, the micro-sequencing circuit 60 may transmit the start signal SS to the display controller 72. Then, the display controller 72 may start the read operation in response to the start signal SS received from the micro-sequencing circuit 60.

The micro-sequencing circuit 60 may monitor an amount of the rendering data RD written on the memory device 50. When the monitored amount exceeds a predetermined value, the micro-sequencing circuit 60 may transmit the start signal SS to the display controller 72. Then, the display controller 72 may immediately start the read operation in response to the start signal SS received from the micro-sequencing circuit 60.

Here, the expression "the amount of the rendering data RD written on the memory device 50 exceeds the predetermined value" refers to a case in which there is no problem in operation even if the display controller 72 reads the region written on the memory device 50 in advance even at a time point when the GPU 20 does not complete the rendering operation.

On the other hand, referring to FIGS. 5 to 7 together, the micro-sequencing circuit 60 may monitor a write pointer WP indicating a point on which the rendering data RD is written in the memory device 50. When the monitored write pointer WP reaches a predetermined region or position, the micro-sequencing circuit 60 may transmit the start signal SS to the display controller 72. Then, the display controller 72 may immediately start the read operation in response to the start signal SS received from the micro-sequencing circuit 60.

For example, referring to FIG. 5, while the GPU 20 performs the rendering operation, the micro-sequencing circuit 60 may detect that the write pointer WP reaches a first position POS1, while monitoring the frame buffer 52 of the memory device 50. Then, the micro-sequencing circuit 60 may transmit the start signal SS to the display controller 72, and the display controller 72 may read a region from the beginning of the frame buffer 52 to the first position POS1 in response to the start signal SS received from the micro-sequencing circuit 60, display the region on the display 76 through the display interface 74 or use it to generate the composite image data CID.

Next, referring to FIG. 6, the micro-sequencing circuit 60 may detect that the write pointer WP reaches the first position POS2, while continuously monitoring the frame buffer 52 of the memory device 50. Then, the micro-sequencing circuit 60 may transmit the start signal SS to the display controller 72, and the display controller 72 may read the region from the first position POS1 to a second position POS2 of the frame buffer 52 in response to the start signal SS.

Next, referring to FIG. 7, the micro-sequencing circuit 60 may detect that the write pointer WP reaches the first position POS3, while continuously monitoring the frame buffer 52 of the memory device 50. Then, the micro-sequencing circuit 60 may transmit the start signal SS to the display controller 72, and the display controller 72 may read a region from the second position POS2 to a third position POS3 of the frame buffer 52 in response to the start signal SS.

According to the semiconductor device 3, the micro-sequencing circuit 60 directly notifies the display controller 72 of a situation in which the display controller 72 may read the memory device 50 even before the GPU 20 completes the rendering operation, and the display controller 72 may start the read operation immediately when receiving the notification. Therefore, the time used for displaying the rendered frame by the display device 70 after the GPU 20 starts the execution of the rendering operation of the image frame may be significantly reduced.

Figure 8:
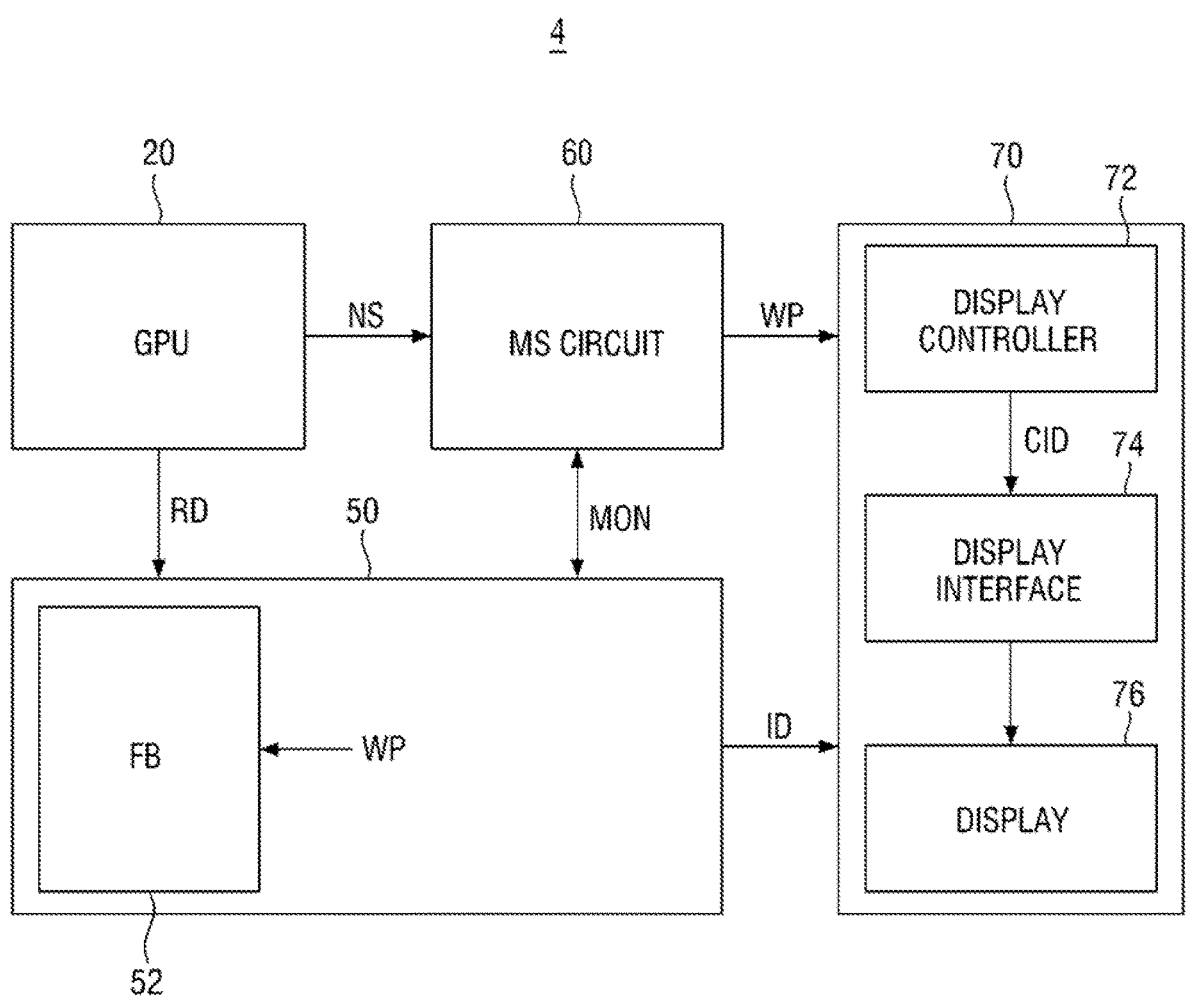
FIG. 8 is a block diagram of a semiconductor device according to embodiments.

FIG. 8 is a block diagram of a semiconductor device 4 according to embodiments.

Referring to FIG. 8, a semiconductor device 4 includes the GPU 20, the memory device 50, the MS circuit 60, and the display device 70.

Differences from the embodiments of FIG. 4 will be mainly described. The micro-sequencing circuit 60 may monitor (MON) the memory device 50 on which the rendering data RD is written while the GPU 20 executes the rendering operation. If the monitoring result satisfies a predetermined condition, the micro-sequencing circuit 60 may transmit a write pointer WP to the display controller 72.

Then, the display controller 72 may perform a read operation on the basis of the write pointer WP received from the micro-sequencing circuit 60.

The micro-sequencing circuit 60 may monitor the write pointer WP that indicates a point on which the rendering data RD is written on the memory device 50. When the monitored write pointer WP reaches a predetermined region or position, the micro-sequencing circuit 60 may transmit the write pointer WP to the display controller 72.

Then, the display controller 72 may determine a read time point of the frame buffer 52 on the basis of the write pointer WP received from the micro-sequencing circuit 60. That is, by determining whether the display controller 72 voluntarily immediately reads the frame buffer 52 on the basis of the write pointer WP or whether to read the frame buffer 52 after waiting for a predetermined time, the display controller 72 may be flexibly operated depending on an implementation purpose.

On the other hand, the display controller 72 may determine the read region of the frame buffer 52 on the basis of the write pointer WP received from the micro-sequencing circuit 60. That is, by determining which region of the frame buffer 52 the display controller 72 voluntarily executes the read on the basis of the write pointer WP, the display controller 72 may be operated flexibly depending on the implementation purpose.

Figure 9:
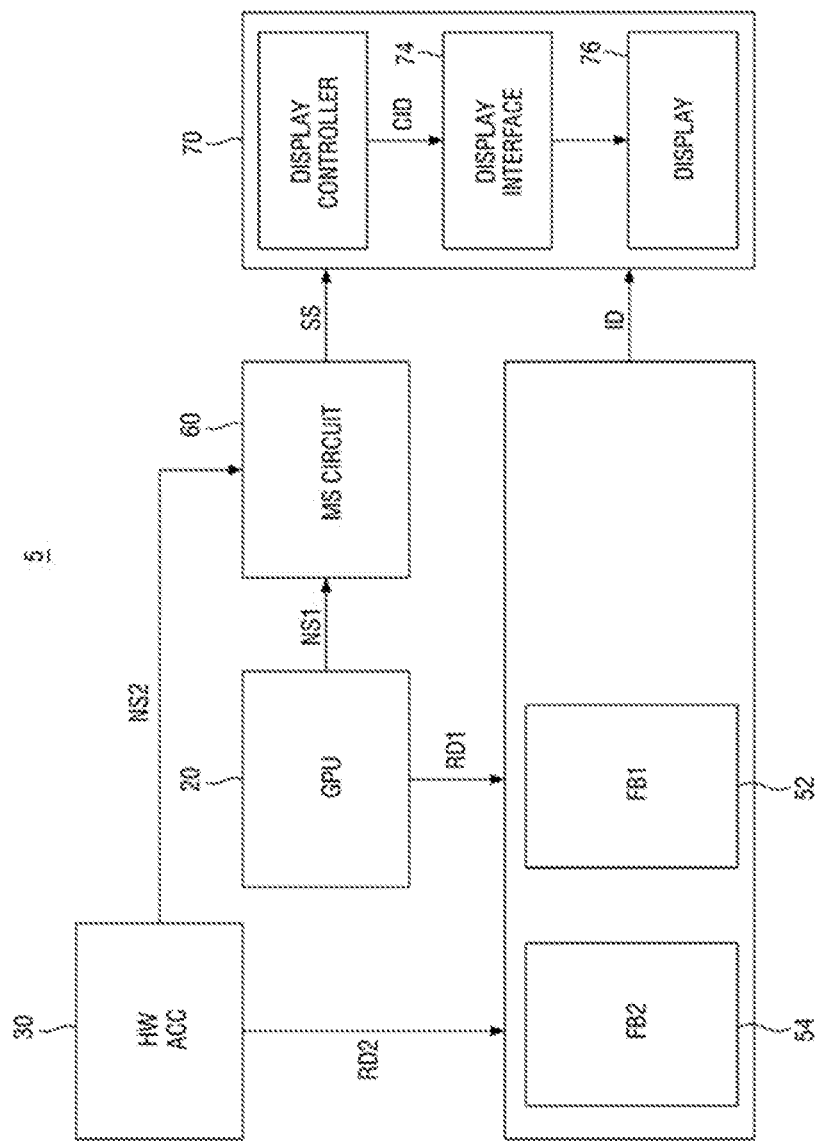
FIG. 9 is a block diagram of a semiconductor device according to embodiments.

FIG. 9 is a block diagram of a semiconductor device 5 according to embodiments.

Referring to FIG. 9, the semiconductor device 5 includes the GPU 20, the hardware acceleration circuit 30, the memory device 50, the MS circuit 60, and the display device 70. The memory device 50 may include a first frame buffer 52 that may be accessed by the GPU 20, and a second frame buffer 54 that may be accessed by the hardware acceleration circuit 30.

The GPU 20 may perform a first rendering operation of the first image frame to generate first rendering data RD1, and may writ the generated first rendering data RD1 on the first frame buffer 52 in the memory device 50.

The hardware acceleration circuit 30 performs a second rendering operation of the second image frame to generate second rendering data RD2, and may write the generated second rendering data RD2 on the second frame buffer 54 in the memory device 50.

The display device 70 may include a display controller 72, a display interface 74 and a display 76. The display controller 72 executes a read operation for reading the memory device 50 to acquire image data ID. Further, the display controller 72 composes the image data ID to generate composite image data CID, and may display the composite image data CID on the display 76 through the display interface 74.

The composite image data CID may compose the first image data acquired from the first rendering data RD1 and the second image data acquired from the second rendering data RD2. For example, the first image data may be displayed on a background of the display 76 and the second image data may be displayed on a foreground of the display 76, or the first image data may be displayed on one region of the display 76 and the second image data may be displayed on another region of the display 76.

The micro-sequencing circuit 60 may control the operation of the display controller 72 depending on the execution degree of the first rendering operation and the second rendering operation.

Either one or both of the GPU 20 and the hardware acceleration circuit 30 may transmit a notification signal NS2 to the micro-sequencing circuit 60, after completion of either one or both of the first rendering operation and the second rendering operation. Further, the micro-sequencing circuit 60 may transmit the start signal SS to the display controller 72 in response to the notification signal NS2. Then, the display controller 72 may immediately start the read operation on either one or both of the first frame buffer 52 and the second frame buffer 54 in response to the start signal SS received from the micro-sequencing circuit 60.

That is, according to the semiconductor device 5, the micro-sequencing circuit 60 may directly notify the display controller 72 of the fact that either one or both of the GPU 20 and the hardware acceleration circuit 30 completes the rendering operation without intervention of the CPU 10, and the display controller 72 may start a read operation immediately upon receiving the notification. Thus, the time used for displaying the rendered frame by the display device 70 after either one or both of the GPU 20 and the hardware acceleration circuit 30 performs the rendering operation of the image frame can be significantly reduced.

Although the GPU 20 is shown as a GPU and the hardware acceleration circuit 30 is shown as a hardware acceleration circuit, the scope of the disclosure is not limited thereto. The GPU 20 or the hardware acceleration circuit 30 may include any device that performs rendering operation of the image frame.

On the other hand, although the notification signal NS2 may include an interrupt signal, the scope of the disclosure is not limited thereto.

Figure 10:
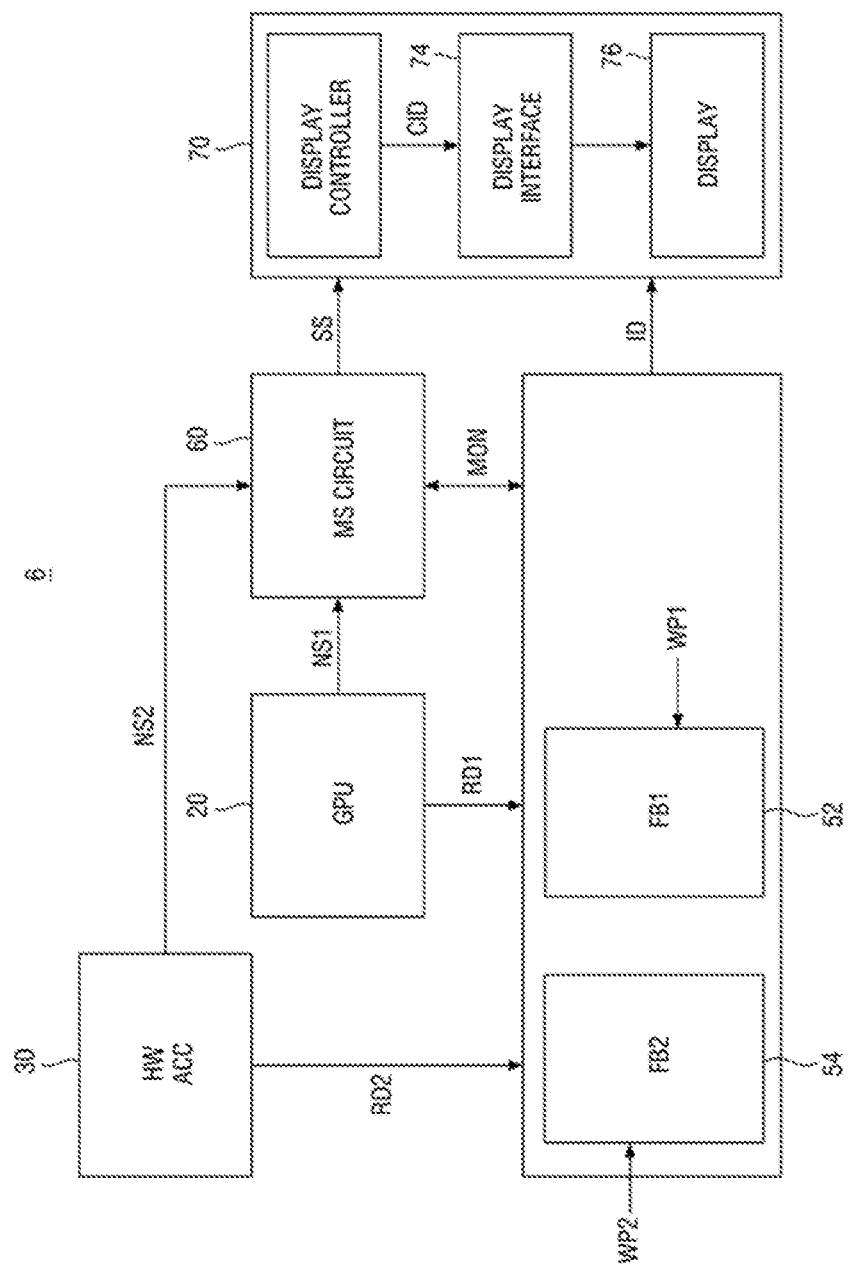
FIG. 10 is a block diagram of a semiconductor device according to embodiments.
Figure 11:
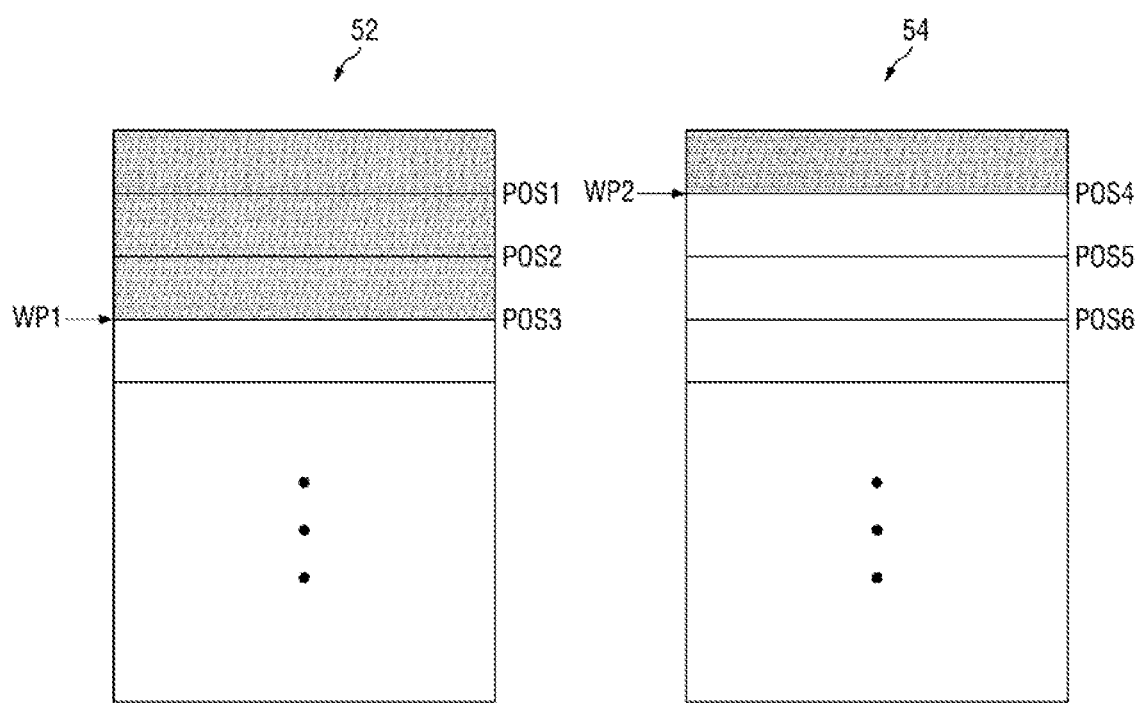
FIG. 11 is a diagram of a frame buffer according to embodiments.

FIG. 10 is a block diagram of a semiconductor device 6 according to embodiments, and FIG. 11 is a diagram of a frame buffer according to embodiments.

Referring to FIG. 10, the semiconductor device 6 includes the GPU 20, the hardware acceleration circuit 30, the memory device 50, the MS circuit 60, and the display device 70. The memory device 50 may include the first frame buffer 52 that may be accessed by the GPU 20 and the second frame buffer 54 that may be accessed by the hardware acceleration circuit 30.

Differences from the embodiments of FIG. 9 will be mainly described. The micro-sequencing circuit 60 may monitor (MON) the memory device 50 on which the first rendering data RD1 and the second rendering data RD2 are written. If the monitoring result satisfies a predetermined condition, the micro-sequencing circuit 60 may transmit the start signal SS to the display controller 72. Then, the display controller 72 may immediately start the read operation on either one or both of the first frame buffer 52 and the second frame buffer 54 in response to the start signal SS received from the micro-sequencing circuit 60.

The micro-sequencing circuit 60 may monitor the amounts of first rendering data RD1 and second rendering data RD2 written on the memory device 50. When the monitored amount exceeds a predetermined value, the micro-sequencing circuit 60 may transmit the start signal SS to the display controller 72. Then, the display controller 72 may immediately start the read operation on either one or both of the first frame buffer 52 and the second frame buffer 54 in response to the start signal SS received from the micro-sequencing circuit 60.

On the other hand, referring to FIG. 11 together, the micro-sequencing circuit 60 may monitor a first write pointer WP1 indicating a point on which that the first rendering data RD1 is written in the first frame buffer 52, and a second write pointer WP2 indicating a point on which the second rendering data RD2 is written in the second frame buffer 54. When either one or both of the monitored first write pointer WP1 and second write pointer WP2 reaches a predetermined region or position of the first frame buffer 52 and the second frame buffer 54, the micro-sequencing circuit 60 may transmit the start signal SS to the display controller 72. Then, the display controller 72 may immediately start the read operation on either one or both of the first frame buffer 52 and the second frame buffer 54 in response to the start signal SS received from the micro-sequencing circuit 60.

For example, referring to FIG. 11, while the GPU 20 and the hardware acceleration circuit 30 perform the rendering operation, the micro-sequencing circuit 60 may detect that the first write pointer WP1 reaches the third position POS3 while monitoring the first frame buffer 52 of the memory device 50. Then, the micro-sequencing circuit 60 may transmit the start signal SS to the display controller 72, and the display controller 72 may read a region up to the third position POS3 of the first frame buffer 52 in response to the start signal SS received from the micro-sequencing circuit 60, and display the region on the display 76 through the display interface 74 or use it to generate the composite image data CID.

On the other hand, the micro-sequencing circuit 60 may detect that the second write pointer WP2 reaches a fourth position POS4, while monitoring the second frame buffer 54 of the memory device 50. Then, the micro-sequencing circuit 60 may transmit the start signal SS to the display controller 72, and the display controller 72 may read a region up to the fourth position POS4 of the second frame buffer 54 in response to the start signal SS received from the micro-sequencing circuit 60, and display the region on the display 76 through the display interface 74 or use it to generate the composite image data CID.

According to the semiconductor device 6, the micro-sequencing circuit 60 may directly notify the display controller 72 of a situation in which the display controller 72 may read the memory device 50 even before the GPU 20 and the hardware acceleration circuit 30 complete the rendering operation, and the display controller 72 may immediately start the read operation upon receiving the notification. Thus, the time used for displaying the rendered frame by the display device 70 after either one or both of the GPU 20 and the hardware acceleration circuit 30 starts the rendering operation execution of the image frame can be significantly reduced.

Figure 12:
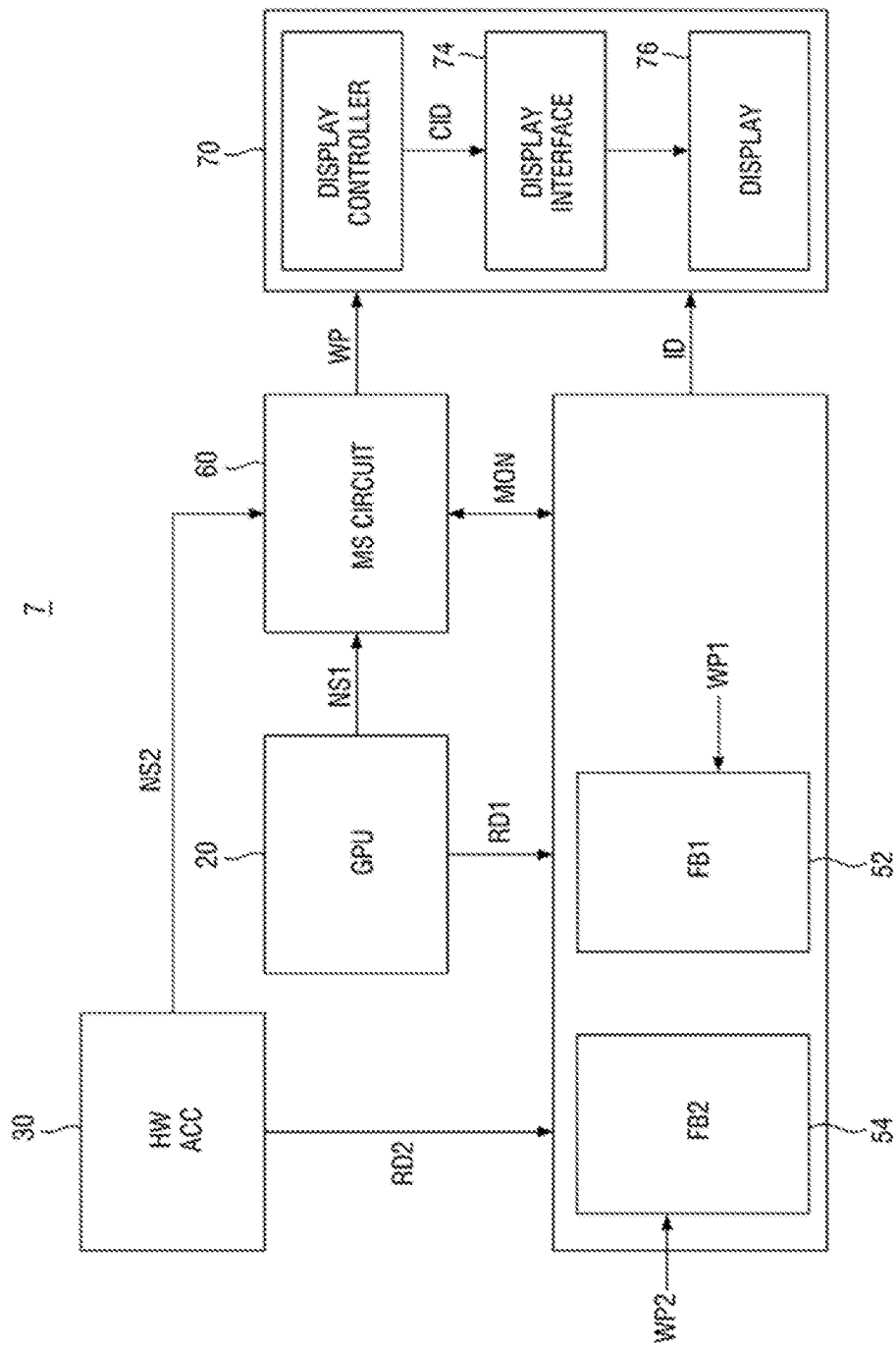
FIG. 12 is a block diagram of a semiconductor device according to embodiments.

FIG. 12 is a block diagram of a semiconductor device 7 according to embodiments.

Referring to FIG. 12, a semiconductor device 7 includes the GPU 20, the hardware acceleration circuit 30, the memory device 50, the MS circuit 60, and the display device 70. The memory device 50 may include the first frame buffer 52 that may be accessed by the GPU 20, and the second frame buffer 54 that may be accessed by the hardware acceleration circuit 30.

Differences from the embodiments of FIG. 10 will be mainly described. The micro-sequencing circuit 60 may monitor (MON) the memory device 50 on which the first rendering data RD1 and the second rendering data RD2 are written. If the monitoring result satisfies a predetermined condition, the micro-sequencing circuit 60 may transmit either one or both of the first pointer WP1 and the second write pointer WP2 to the display controller 72. Then, the display controller 72 performs a read operation on the basis of either one or both of the first pointer WP1 and the second write pointer WP2 received from the micro-sequencing circuit 60.

The micro-sequencing circuit 60 may monitor the first write pointer WP1 indicating a point on which the first rendering data RD1 is written in the first frame buffer 52, and the second write pointer WP2 indicating a point on which the second rendering data RD2 is written in the second frame buffer 54. When either one or both of the monitored first write pointer WP1 and second write pointer WP2 reaches predetermined regions or positions of the first frame buffer 52 and the second frame buffer 54, the micro-sequencing circuit 60 may transmit either one or both of the first write pointer WP1 and the second write pointer WP2 to the display controller 72.

Then, the display controller 72 may determine the read time point of either one or both of the first frame buffer 52 and the second frame buffer 54 on the basis of the first write pointer WP1 and the second write pointer WP2 received from the micro-sequencing circuit 60. That is, by determining whether the display controller 72 voluntarily and immediately reads either one or both of the first frame buffer 52 and the second frame buffer 54 on the basis of either one or both of the first write pointer WP1 and the second write pointer WP2 or whether to read either one or both of the first frame buffer 52 and the second frame buffer 54 after waiting for a predetermined time, the display controller 72 may be flexibly operated depending on an implementation purpose.

On the other hand, the display controller 72 may determine a read region of either one or both of the first frame buffer 52 and the second frame buffer 54 on the basis of either one or both of the first write pointer WP1 and the second write pointer WP2 received from the micro-sequencing circuit 60. That is, by determining which region of either one or both of the first frame buffer 52 and the second frame buffer 54 the display controller 72 voluntarily executes the read on the basis of either one or both of the first write pointer WP1 and the second write pointer WP2, the display controller 72 may be operated flexibly depending on the implementation.

As is traditional in the field of the inventive concepts, the embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

In concluding the detailed description, those skilled in the art will appreciate that many variations and modifications may be made to the embodiments without substantially departing from the principles of the disclosure. Therefore, the embodiments of the disclosure are used in a generic and descriptive sense only and not for purposes of limitation.

What is claimed is:

1. A semiconductor device comprising:
a processor configured to:
 perform a rendering operation of an image frame to acquire rendering data; and
 write the acquired rendering data on a memory device;
a display controller configured to perform a read operation of the memory device on which the rendering data is written, to acquire image data; and
a micro-sequencing circuit configured to:
 monitor a write pointer indicating a point on which the rendering data is written in the memory device;
 determine whether the monitored write pointer reaches a predetermined address of the memory device; and
 in response to the monitored write pointer being determined to reach the predetermined address of the memory device, transmit a start signal to the display controller, based on a degree of execution of the rendering operation,
wherein the display controller is further configured to, based on the transmitted start signal, start the read operation.

2. The semiconductor device of claim 1, wherein the processor is further configured to, in response to the rendering operation being completed, transmit a notification signal to the micro-sequencing circuit, and
wherein the micro-sequencing circuit is further configured to, based on the transmitted notification signal, transmit the start signal to the display controller.

3. The semiconductor device of claim 2, wherein the notification signal includes an interrupt signal.

4. The semiconductor device of claim 1, wherein the micro-sequencing circuit is further configured to perform a monitoring operation of the memory device, while the processor performs the rendering operation, and
wherein the micro-sequencing circuit is further configured to, in response to a result of the monitoring operation satisfying a predetermined condition, transmit the start signal to the display controller.

5. The semiconductor device of claim 4, wherein the micro-sequencing circuit is further configured to monitor an amount of the rendering data that is written on the memory device, and
wherein the micro-sequencing circuit is further configured to:
 determine whether the monitored amount exceeds a predetermined value; and
 in response to the monitored amount being determined to exceed the predetermined value, transmit the start signal to the display controller.

6. The semiconductor device of claim 1, wherein the processor is further configured to:
acquire first rendering data; and
store the acquired first rendering data in a first frame buffer of the memory device, and wherein the semiconductor device further comprises another processor configured to:
acquire second rendering data; and
store the acquired second rendering data in a second frame buffer of the memory device.

7. A semiconductor device comprising:
a processor configured to:
 perform a rendering operation of an image frame to acquire rendering data; and
 write the acquired rendering data on a frame buffer;
a micro-sequencing circuit configured to:

monitor a write pointer indicating a point on which the rendering data is written in the frame buffer, while the processor performs the rendering operation;

determine whether the monitored write pointer reaches a predetermined address of the frame buffer; and in response to the monitored write pointer being determined to reach the predetermined address of the frame buffer, transmit the monitored write pointer; and a display controller configured to, based on the transmitted write pointer, perform a read operation of the frame buffer on which the rendering data is written, to acquire image data.

8. The semiconductor device of claim 7, wherein the display controller is further configured to acquire a read time point of the frame buffer on which the rendering data is written, based on the transmitted write pointer.

9. The semiconductor device of claim 7, wherein the display controller is further configured to acquire a read region of the frame buffer on which the rendering data is written, based on the transmitted write pointer.

10. The semiconductor device of claim 7, wherein the processor comprises a first processor and a second processor, wherein the frame buffer comprises a first frame buffer and a second frame buffer, wherein the first processor is further configured to:
perform a first rendering operation of a first image frame to acquire first rendering data; and
write the acquired first rendering data on the first frame buffer, and wherein the second processor is further configured to:
perform a second rendering operation of a second image frame to acquire second rendering data; and
write the acquired second rendering data on the second frame buffer, and wherein the micro-sequencing circuit is further configured to:
monitor a first write pointer indicating a first point on which the first rendering data is written in the first frame buffer, and a second write pointer indicating a second point on which the second rendering data is written in the second frame buffer;
determine whether either one or both of the monitored first write pointer reaches a first predetermined address of the first frame buffer and the monitored second write pointer reaches a second predetermined address of the second frame buffer; and
in response to either one or both of the monitored first write pointer being determined to reach the first predetermined address of the first frame buffer and the monitored second write pointer being determined to reach the second predetermined address of the second frame buffer, transmit, to the display controller, either one or both of the monitored first write pointer and the monitored second write pointer.

11. The semiconductor device of claim 10, wherein the display controller is further configured to acquire a read time point of either one or each of the first frame buffer and the second frame buffer, based on either one or both of the transmitted first write pointer and the transmitted second write pointer.

12. The semiconductor device of claim 10, wherein the display controller is further configured to acquire a read region of either one or each of the first frame buffer and the second frame buffer, based on either one or both of the transmitted first write pointer and the transmitted second write pointer.

13. A semiconductor device comprising:

a memory device comprising a first frame buffer and a second frame buffer; and a first processor configured to:
perform a first rendering operation of a first image frame to acquire first rendering data; and
write the acquired first rendering data on the first frame buffer;

a second processor configured to:
perform a second rendering operation of a second image frame to acquire second rendering data; and
write the acquired second rendering data on the second frame buffer; and a micro-sequence circuit configured to:
control an operation of a display controller, based on a degree of execution of each of the first rendering operation and the second rendering operation;
monitor a first write pointer indicating a first point on which the first rendering data is written in the first frame buffer, and a second write pointer indicating a second point on which the second rendering data is written in the second frame buffer;
determine whether either one or both of the monitored first write pointer reaches a first predetermined address of the first frame buffer and the monitored second write pointer reaches a second predetermined address of the second frame buffer; and
in response to either one or both of the monitored first write pointer being determined to reach the first predetermined address of the first frame buffer and the monitored second write pointer being determined to reach the second predetermined address of the second frame buffer, transmit a start signal to the display controller.

14. The semiconductor device of claim 13, wherein the first processor is further configured to, in response to the first rendering operation being completed, transmit a first notification signal to the micro-sequencing circuit, wherein the second processor is further configured to, in response to the second rendering operation being completed, transmit a second notification signal to the micro-sequencing circuit, and wherein the micro-sequencing circuit is further configured to, in response to the transmitted first notification signal or the transmitted second notification signal, transmit the start signal to the display controller.

15. The semiconductor device of claim 14, wherein each of the first notification signal and the second notification signal comprises an interrupt signal.

16. The semiconductor device of claim 13, wherein the micro-sequencing circuit is further configured to perform a monitoring operation the memory device on which the first rendering data and the second rendering data are written, and wherein the micro-sequencing circuit is further configured to:
determine whether a result of the monitoring operation satisfies a predetermined condition; and
in response to the result of the monitoring operation being determined to satisfy the predetermined condition, transmit the start signal to the display controller.

17. The semiconductor device of claim 16, wherein the micro-sequencing circuit is further configured to monitor a first amount of the first rendering data that is written on the memory device, and a second amount of the second rendering data that is written on the memory device, and
wherein the micro-sequencing circuit is further configured to:
determine whether either one or each of the monitored first amount and the monitored second amount exceeds a predetermined value; and
in response to either one or each of the monitored first amount and the monitored second amount being determined to exceed the predetermined value, transmit the start signal to the display controller.

18. The semiconductor device of claim 13, wherein the micro-sequencing circuit is further configured to, in response to either one or both of the monitored first write pointer being determined to reach the first predetermined address of the first frame buffer and the monitored second write pointer being determined to reach the second predetermined address of the second frame buffer, transmit, to the display controller, either one or both of the monitored first write pointer and the monitored second write pointer.

* * * * *